US008805056B2

(12) United States Patent
Bala et al.

(10) Patent No.: US 8,805,056 B2
(45) Date of Patent: Aug. 12, 2014

(54) AUTOMATIC DETECTION AND GROUPING OF STRAIGHT LINES IN IMAGES FOR PERSONALIZATION

(75) Inventors: Raja Bala, Webster, NY (US); Zhigang Fan, Webster, NY (US); Hengzhou Ding, West Lafayette, IN (US); Jan P. Allebach, West Lafayette, IN (US); Charles A. Bouman, West Lafayette, IN (US)

(73) Assignee: Xerox Corporation, Norwalk, CT (US)

( * ) Notice: Subject to any disclaimer, the term of this patent is extended or adjusted under 35 U.S.C. 154(b) by 672 days.

(21) Appl. No.: 13/011,959

(22) Filed: Jan. 24, 2011

(65) Prior Publication Data
US 2012/0189190 A1    Jul. 26, 2012

(51) Int. Cl.
*G06K 9/00*    (2006.01)
(52) U.S. Cl.
USPC ........................................................ 382/154
(58) Field of Classification Search
USPC ................................................ 382/154, 176
See application file for complete search history.

(56) References Cited

U.S. PATENT DOCUMENTS

| | | | | |
|---|---|---|---|---|
| 4,970,653 | A * | 11/1990 | Kenue ............................ | 701/301 |
| 6,037,936 | A * | 3/2000 | Ellenby et al. ................. | 715/764 |
| 6,668,082 | B1 * | 12/2003 | Davison et al. ............... | 382/190 |
| 6,973,213 | B2 * | 12/2005 | Fan et al. ....................... | 382/176 |
| 2008/0219515 | A1 * | 9/2008 | Namgoong .................... | 382/117 |
| 2009/0067670 | A1 * | 3/2009 | Johnson et al. ............... | 382/100 |
| 2010/0156919 | A1 | 6/2010 | Bala et al. | |
| 2010/0302594 | A1 | 12/2010 | Chapman et al. | |

OTHER PUBLICATIONS

Gaspar et al. ("Interactive Reconstruction from an Omnidirectional Image", 9th International Symposium on Intelligent Robotic Systems, pp. 1-9, Jul. 2001.*
Clark et al. ("Recognising Text in Real Scenes", 2002, International Journal on Document Analysis and Recognition, vol. 4, No. 4, pp. 243-257).*
Canny, John "A Computational Approach to Edge Detection" IEEE Transactions on Pattern Analysis and Machine Intelligence, vol., PAMI-8, No. 6, pp. 679-698, Nov. 1986.
Ding et al. "Semi-Automatic Object Geometry Estimation for Image Personalization" SPIE-IS&T/vol. 7533, downloaded from SPIE Digital Library on Sep. 14, 2011, 11 pgs.
Duda et al. "Use of the Hough Transformation to Detect Lines and Curves in Pictures" Comm. ACM, vol. 15, No. pp. 11-15, Jan. 1972.

* cited by examiner

*Primary Examiner* — Chan Park
*Assistant Examiner* — Elisa Rice
(74) *Attorney, Agent, or Firm* — Fay Sharpe LLP

(57) ABSTRACT

As set forth herein, a computer-implemented method is employed to place personalized text into an image. A location within the image is selected where the text is to be placed, and region is grown around the selected location. The 3D geometry of the surface is estimated proximate to the location and sets of parallel straight lines in the image are identified and selected to define a bounding polygon into which text may be inserted. Optionally, a user is permitted to adjust the bounding polygon once it has been automatically generated.

21 Claims, 22 Drawing Sheets
(18 of 22 Drawing Sheet(s) Filed in Color)

AUTOMATIC DETECTION AND GROUPING OF STRAIGHT LINES IN IMAGES FOR PERSONALIZATION

TECHNICAL FIELD

The present exemplary embodiments broadly relate to the insertion of variable text into images. They find particular application with the estimation of image object geometry to provide appropriate text placement therein. However, it is to be appreciated that the present exemplary embodiments are also amenable to other like applications.

BACKGROUND

Today, there is great interest in the personalization and customization of images as a way to add value to documents. This is especially true in transactional and promotional marketing applications, but is gaining traction in more image intensive markets such as photo finishing, whereby personalized calendars, photobooks, greeting cards, and the likes are created. Several technologies currently exist to personalize images such as XMPie, DirectSmile, and AlphaPictures, for example.

One form of image personalization incorporates variable text into a fixed image in a natural way. One of the main challenges in incorporating text into an image is to estimate the 3D geometric properties of the surface on which the text is to be rendered. Existing tools handle the problem by presenting via a GUI a 2D text grid that can be overlaid on the image and locally warped in 2-dimensions to appear to fit onto the 3D object surface.

U.S. patent application Ser. No. 12/340,103 presents a semi-automatic method and system for determining 3D geometry of a planar surface within the image, and inserting or replacing text on that planar surface, in which a pinhole camera model is assumed. With this model, planar surface geometry is uniquely determined via the knowledge of two vanishing points obtained from mutually perpendicular convergent lines that are parallel in the 3D scene. The problem then translates to determining the orientation of the pairs of parallel lines. This task can be done fairly readily by a user. However in order to increase the level of automation of the algorithm, or equivalently, to reduce the burden on the part of the user, it is desirable to have a fully automatic technique to identify pairs of parallel lines in the image.

What are therefore needed are convenient and easy-to-use systems and methods to automatically identify sets of parallel lines that help define regions and surface geometry in an image for insertion of personalized text into the image in a natural and less restrictive manner.

BRIEF DESCRIPTION

In one aspect, a computer-implemented method for determining planar surface geometry for image personalization comprises receiving a two-dimensional (2D) image having a selected location within the image for personalization, automatically growing a region around the selected location in the 2D image, automatically estimating parameters required for deriving three-dimensional (3D) planar geometry of the grown region, and determining the 3D planar geometry of the grown region as a function of the estimated 3D parameters.

In another aspect, a computer implemented method for defining a bounding polygon in an image for text insertion comprises receiving an image for personalization, receiving input regarding a user-selected location in the image for text insertion, and growing a region around the selected location. The method further comprises generating an edge map of the grown region, detecting straight lines in the edge map, and grouping detected lines into sets of parallel lines. Additionally, the method comprises selecting two pairs of parallel lines, each pair being perpendicular to the other in 3D space, estimating a 3D geometry of the grown region based on the selected pairs of parallel lines, and rendering a personalized text string in the grown region according to the estimated 3D geometry.

BRIEF DESCRIPTION OF THE DRAWINGS

The file of this patent contains at least one drawing executed in color. Copies of this patent with color drawing(s) will be provided by the United States Patent and Trademark Office upon request and payment of the necessary fee.

DETAILED DESCRIPTION

Figure 1:
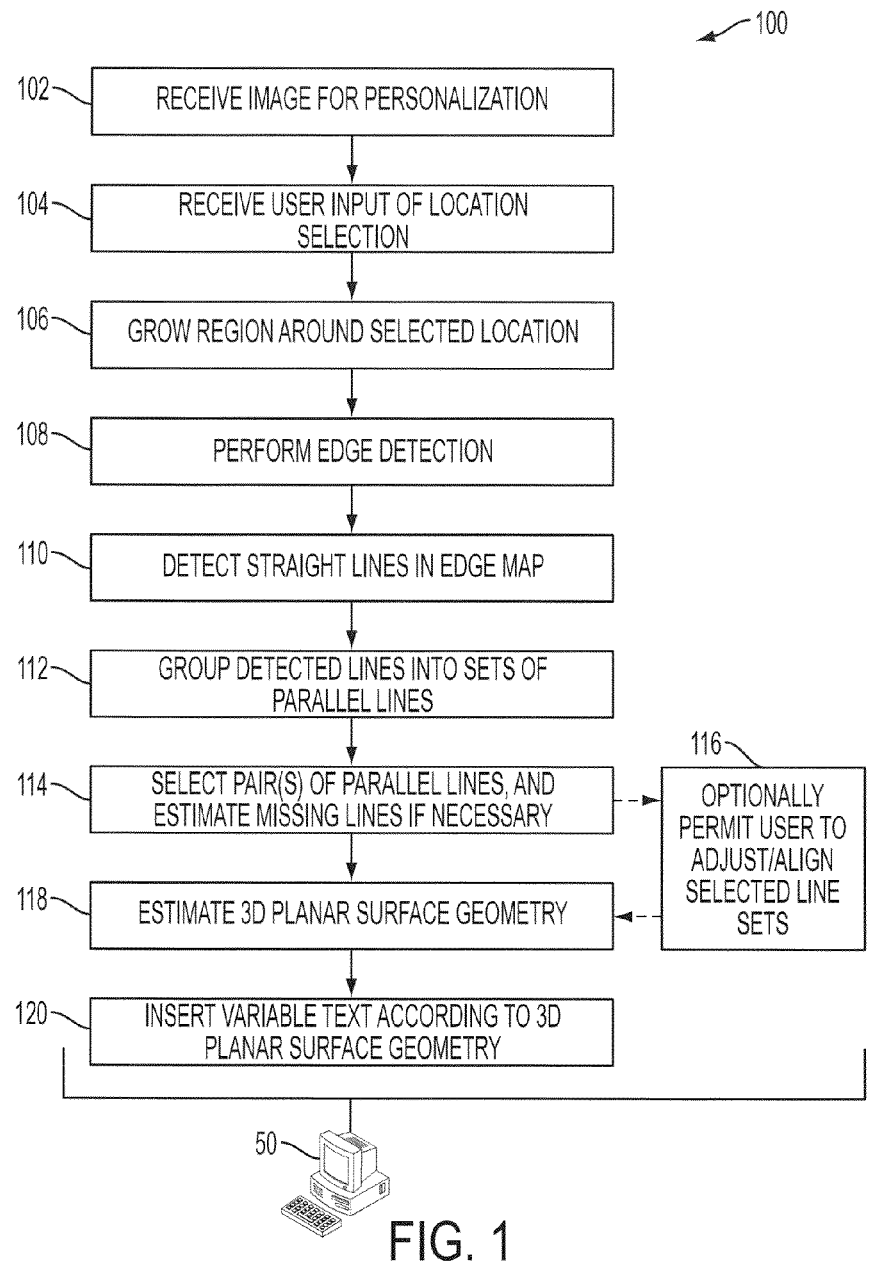
FIG. 1 illustrates a methodology to incorporate a personalized text string into an image based at least in part upon automatically detected parallel lines that define edges of a 3D geometry related thereto.

The systems and methods described herein can be utilized to automatically and intelligently make an initial estimate of parallel lines for 3D planar surface geometry calculation in the case where text is inserted into the image. The user first selects a location within a planar surface wherein personalized text is to be inserted. Next, a region growing algorithm is used to grow a homogenous region around this location, as described in U.S. patent application Ser. No. 12/340,103, which is hereby incorporated by reference in its entirety herein. In the described systems and methods, an edge detection algorithm is then used to find edge features within the grown region. In one example, the edge detection algorithm employs a Canny edge detection technique. From the edge image, straight lines are detected using Hough transforms for the image, and the straight lines are grouped into candidate sets of parallel lines. In this manner, the described systems and methods provide an intelligent strategy for grouping parallel lines that accounts for plausible planar surface geometries. From the grouped lines, two pairs of parallel lines are detected and presented to the user via a GUI. If desired, the user can then refine or adjust the orientations of the line pairs. The final line pairs are then used to calculate 3D planar surface geometry, which is in turn used to render the personalized text onto the image.

A computer 50 can be employed as one possible hardware configuration to support the systems and methods described herein. It is to be appreciated that although a standalone architecture is illustrated, any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 50 can include a processing unit (not shown) that executes, and a system memory (not shown) that stores, one or more sets of computer-executable instructions (e.g., modules, programs, routines, algorithms, etc.) for performing the various functions, procedures, methods, protocols, techniques, etc., described herein. The computer can further include a system bus (not shown) that couples various system components including the system memory to the processing unit. The processing unit can be any of various commercially available processors. Dual microprocessors and other multiprocessor architectures also can be used as the processing unit.

As used herein, "algorithm" refers to a set of computer-executable instructions persistently stored on a computer-readable medium (e.g., a memory, hard drive, disk, flash drive, or any other suitable storage medium). Moreover, the steps of the methods described herein are executed by a computer unless otherwise specified as being performed by a user.

The computer 50 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through a keyboard (not shown), a pointing device (not shown), a mouse, thumb pad, voice input, stylus, touchscreen, etc. The computer 50 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

FIG. 1 illustrates a methodology 100 to incorporate a personalized text string into an image based at least in part upon automatically detected parallel lines that define edges of a 3D geometry related thereto. At reference numeral 102, an image is input or retrieved for personalization. At 104, a planar surface is selected within the image, where text is to be placed. In one embodiment, the user can select a point on a surface for text insertion. At 106, a region-growing algorithm then grows a region about the selected point. The region growing can be performed based on a defined homogeneity criterion imposed on, for example, pixel color, pixel luminance, or texture. In another embodiment, one or more suitable locations, surfaces, and/or regions for text insertion are automatically determined by analyzing the image. An exemplary approach for accomplishing this would be to employ a segmentation algorithm that identifies uniform regions according to a defined homogeneity criterion imposed on, for example, pixel color, luminance or texture.

At 108, an edge detection algorithm is executed to identify edge features in the grown region. In one embodiment, the edge detection algorithm is a Canny edge detection algorithm, although other edge detection algorithms may be employed as will be appreciated by those of skill in the art. At 110, straight lines are detected using one or more Hough transforms for the image. At 112, the detected straight lines are grouped into candidate sets of parallel lines that enclose the grown region and thereby define the geometry of the surface on which the initial selected point is positioned. From the candidate parallel line sets, two pairs of parallel lines are detected or selected and presented to a user via a GUI or the like, at 114. If necessary, missing lines are estimated at this step. At 116, the user is optionally permitted to adjust or refine the selected parallel lines to more accurately align to the edges of the surface in the image, if desired. At 118, the line pairs are used to estimate 3D planar surface geometry and define a bounding polygon into which text is inserted. At 120, the estimated 3D planar surface geometry information is used to render personalized text onto the selected planar surface in the image.

The 3D planar surface geometry estimation at 118 can be accomplished based on a first and a second convergent line set within the image. The lines within each set are parallel in 3D space. Furthermore, the lines in the first set are of a known angle, preferably orthogonal, to those convergent line sets that are in the second set in 3D space. In one embodiment, the convergent line sets are identified automatically by the algorithm 100. In another embodiment, the convergent line sets are initially automatically estimated, and then adjusted by the user via a graphical interface.

In addition, a first vanishing point and a second vanishing point are identified in the image based at least in part upon the convergent lines. The first and second vanishing points can be determined via known 3-dimensional geometric principles. Once the convergent lines and vanishing points are determined, a field of view of the image is determined. The field of view can be defined in either the horizontal, vertical or diagonal direction and can be calculated utilizing basic trigonometric principles. In addition, a normal vector can be determined from the two vanishing points. In one approach, a cross-product of two orthogonal vectors can be calculated to ascertain the normal vector. Once both the field of view and the normal vector are calculated, they can be utilized to determine the 3-dimensional geometry of the text to be placed within the image. Calculation of field of view and normal vector from vanishing points of parallel line sets is fully disclosed in U.S. patent application Ser. No. 12/340,103.

The rendering of the variable or personalized text string at 120 can be performed in various manners. For instance, input of the text can be facilitated via substantially any known data entry means such as a GUI processing component, or retrieval from a database of personalized text record, and can include characters in any language. The personalized text string is incorporated into the image based at least in part upon the estimated 3D geometry. In one approach, the text is inserted onto a virtual planar surface, whose geometry has been estimated from the parallel line data, and overlaid onto the actual image. Examples of planar surfaces in the image include without limitation a chalk board, a street sign, a license plate, a wall, a floor, a ceiling, etc. The variable text is rendered in the location based at least in part upon the 3-dimensional geometry of the location, which can be calculated via the field of view and the normal vector. In this manner, the variable text string appears as though it was included in the image in its original state. It is understood that a personalized text string might include simple symbols such as stars, smileys, icons, etc., commonly referred to as "wingdings."

Figure 2B:
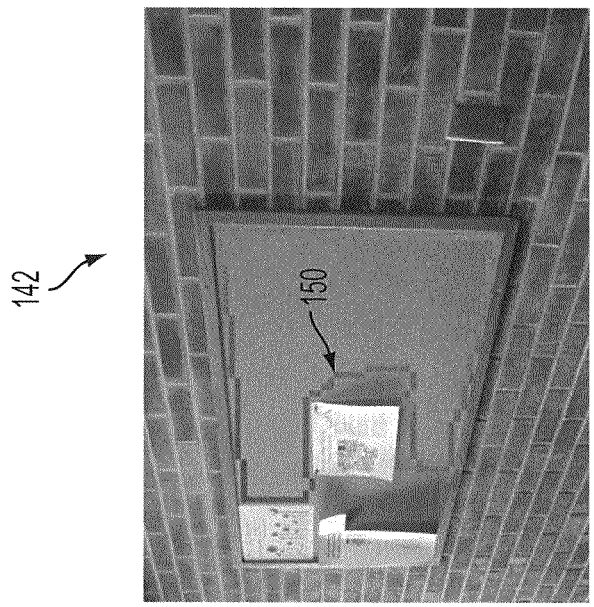
FIGS. 2A-2E illustrate examples image surface selection, region growth, and edge detection.
Figure 2A:
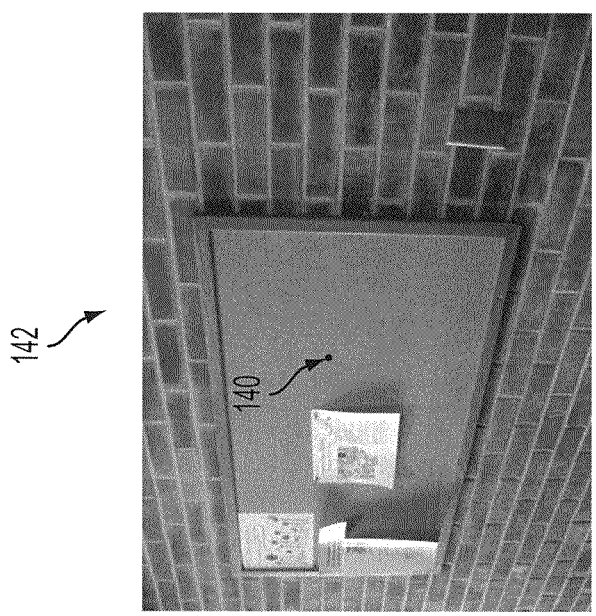
Figure 2C:
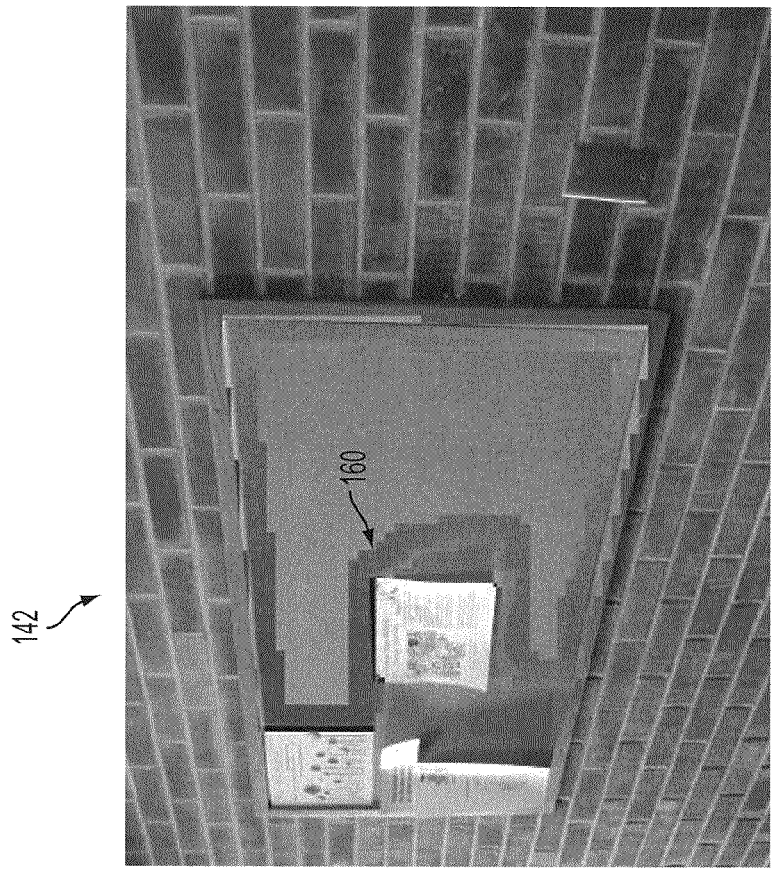

FIGS. 2A-2E illustrate image surface selection, region growth, and edge detection, as described above with regard to steps 104, 106, and 108, respectively. As shown in FIG. 2A, the text insertion process starts with the user selecting an initial location 140 on an image 142. As shown in FIG. 2B, a region growing technique is then used to generate a region 150 around the selected location according to a statistical measure. In one example, the whole image is divided into square blocks, with a typical block size of 12 pixels or so, and a block-based connected component analysis is applied to grow the region, taking the 2×2-block region surrounding the user selected point as the seed region. A Kullback-Leibler (KL) divergence is used to measure statistical similarity between blocks. Using this measure, blocks having a level of similarity that is within a predetermined threshold (e.g., determined adaptively) are included in the region. Finally a morphological closing operation is applied to the final grown region, to fill in small holes. Next, edges are detected within the vicinity of the grown region. The boundary of the grown region in FIG. 2B is dilated. The edge detector algorithm is then applied to the area covered by the dilated boundary, as shown in FIG. 2C.

In one example, using Canny's edge detector, a gradient intensity image is obtained within the grown region. A non-maximal suppression step is applied to retain all local directional maxima in the gradient intensity image. This is followed by a hysteresis thresholding step. For instance, a parametric approach may be used to determine a suitable lower and upper threshold for hysteresis thresholding. In this example, all the remaining non-zero gradient intensities in the image are sorted from smallest to largest. The lower 80% (or so) of the sorted values are then utilized to estimate a Laplacian distribution.

Figure 2D:
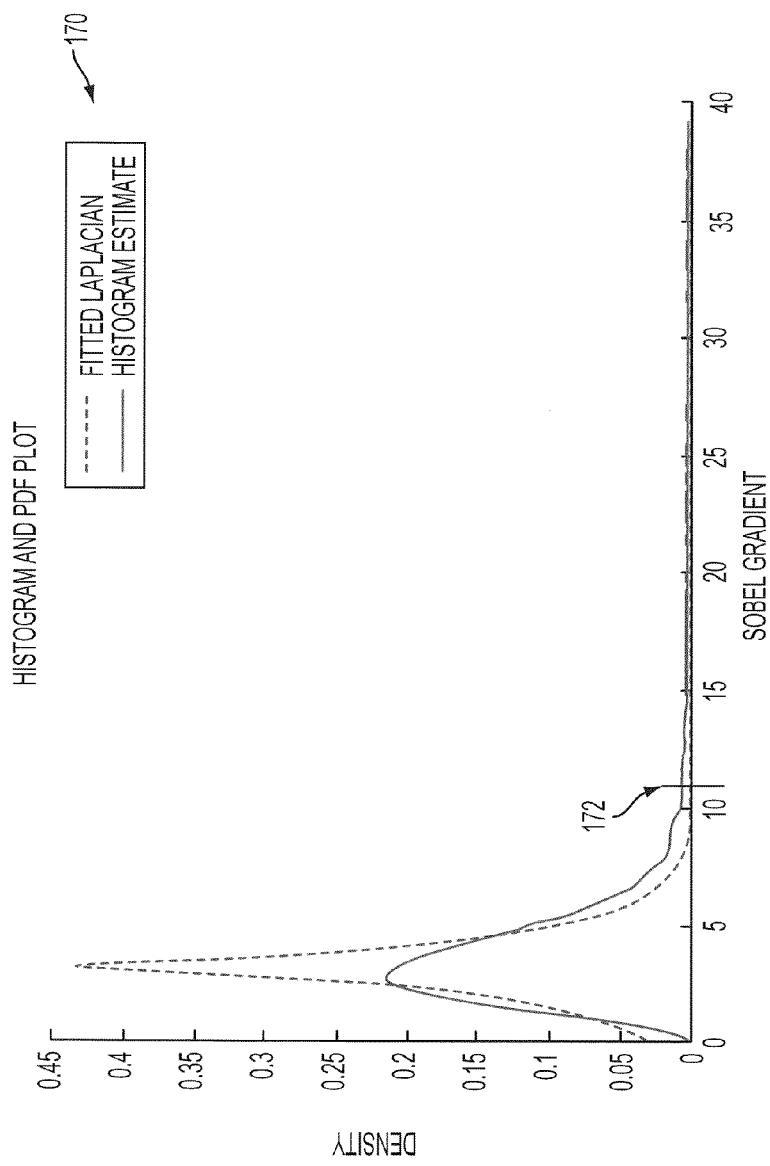

FIG. 2D is a graph 170 showing a density estimate (red curve) using histograms of the remaining non-zero gradient intensities and a fitted Laplacian distribution (green curve), when using the lower 80% of the sorted values. The high threshold 172 is determined at the location of 99.9% of the probability density function of the Laplacian distribution. In the example image 142, the high threshold turns out to be 11.25. The low threshold is then computed as half of the high threshold. The choice of Laplacian distribution results in a robust estimation of the thresholds.

Figure 2E:
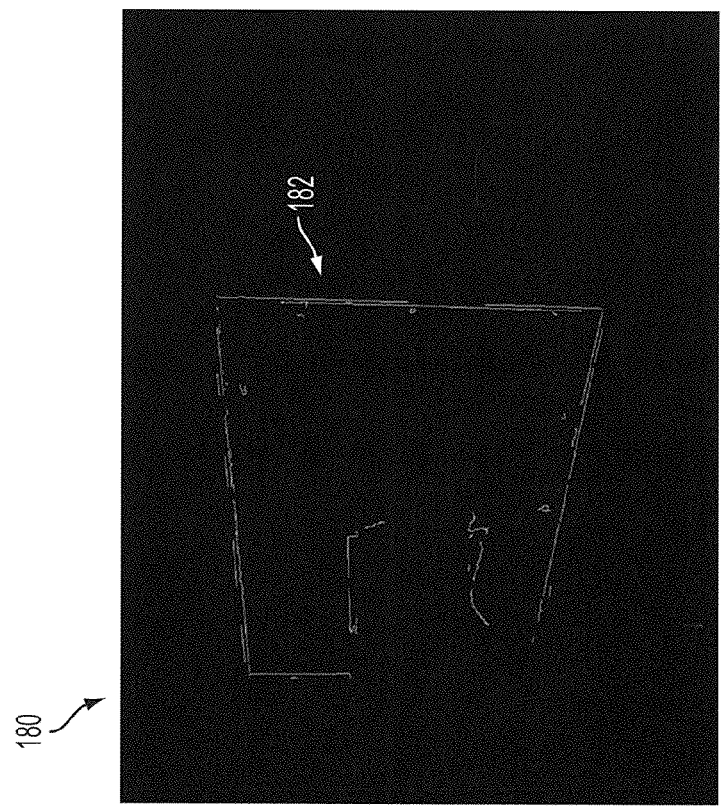

FIG. 2E illustrates a display 180 (e.g., on a GUI or the like) showing the final edge detection result as an edge map 182 in the dilated boundary region of FIG. 2C.

Figure 3A:
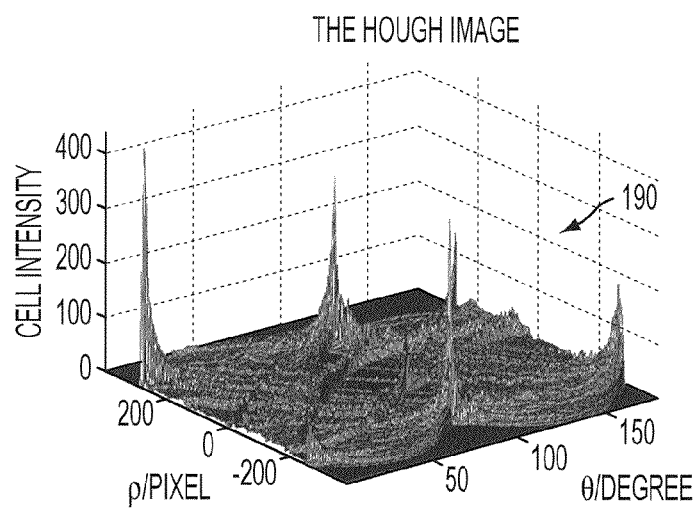
FIGS. 3A-3H illustrate straight line detection using the Hough Transform to identify straight lines in a grown region in the image.

FIGS. 3A-3H illustrate straight line detection using the Hough Transform as described with regard to step 110 of FIG. 1. To detect straight lines in the edge map shown in FIG. 2E, a Hough Transform of the edge map is computed, as shown in FIG. 3A. This step reduces the original problem of detecting straight lines in the image space to the dual problem of identifying peaks in the parameter space. In particular, the angle-radius (O-p) parameterization of lines is adopted. This approach involves denoting the set of edge points in the edge image by $\{x_i, y_i | i=1, 2, \ldots\}$. The Hough Transform of a single edge point $(x_0, y_0)$ is then given by the equation:

$$\rho = x_0 \cos \theta + y_0 \sin \theta,$$

which is a sinusoidal curve. In implementation, the θ-ρ space is quantized into an accumulator array of cells. If the sinusoidal curve passes through one of the cell, then that cell is incremented by 1. The Hough Transform of the entire edge image is then computed by transforming all edge points and incrementing the accumulator array accordingly.

Once the Hough Transform 190 has been computed, peaks are located in the Hough Transform result. In one embodiment, an iterative identification and removal strategy is employed to accomplish the task. In this embodiment, instead of attempting to threshold and identify all peaks at the same time, peaks are extracted sequentially, starting from the strongest one. However, it will be appreciated that in other embodiments all peaks may be thresholded and identified concurrently. After a peak is identified, the edge points in the original edge map that have contributed to 3×3 neighborhood cells surrounding the peak are removed from the edge map. Consequently, a new Hough Transform result is formed, with the peak removed. This iterative process is illustrated FIGS. 3B-3H.

Figure 3B:
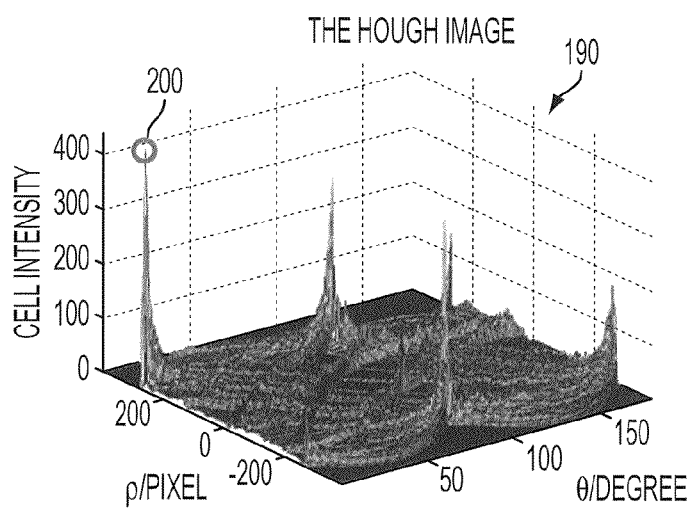
Figure 3C:
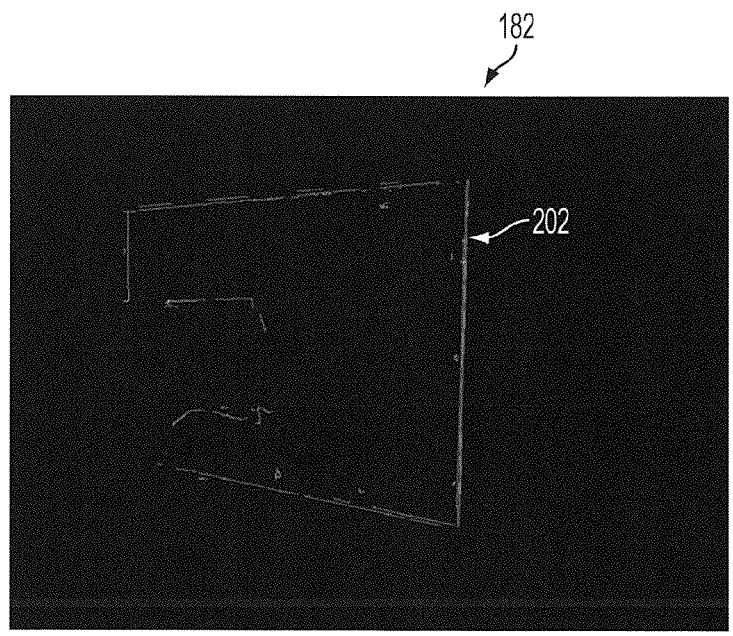
Figure 3D:
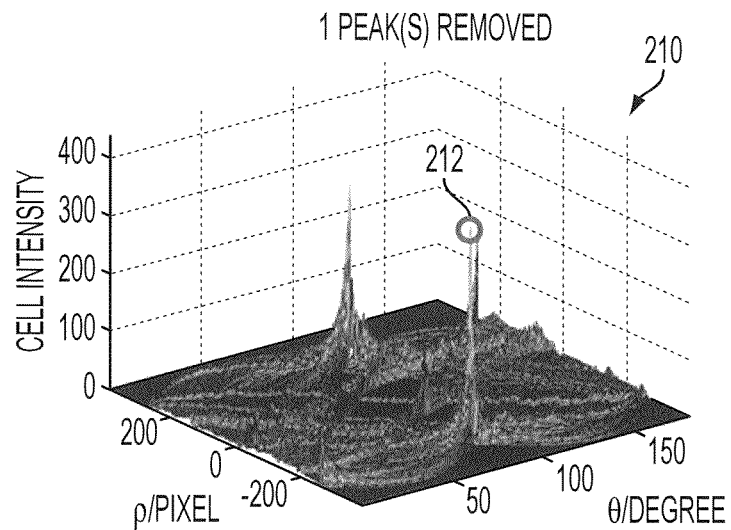
Figure 3E:
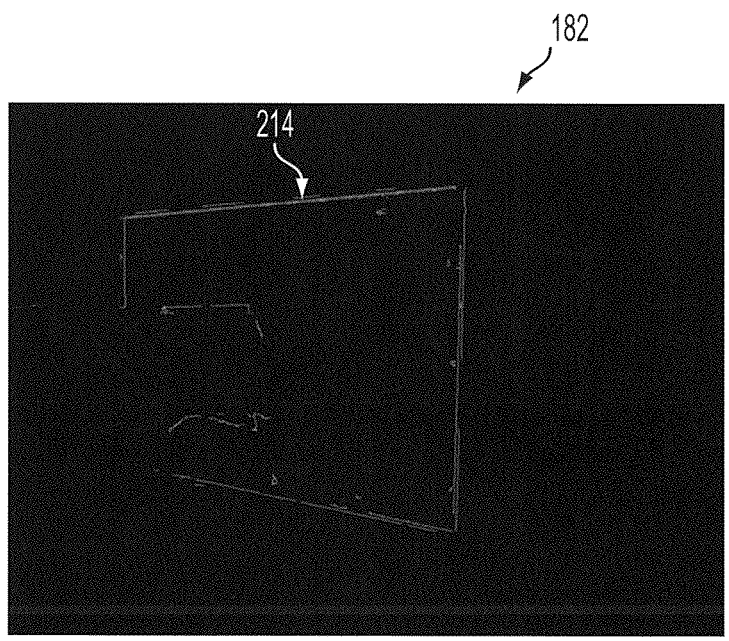
Figure 3F:
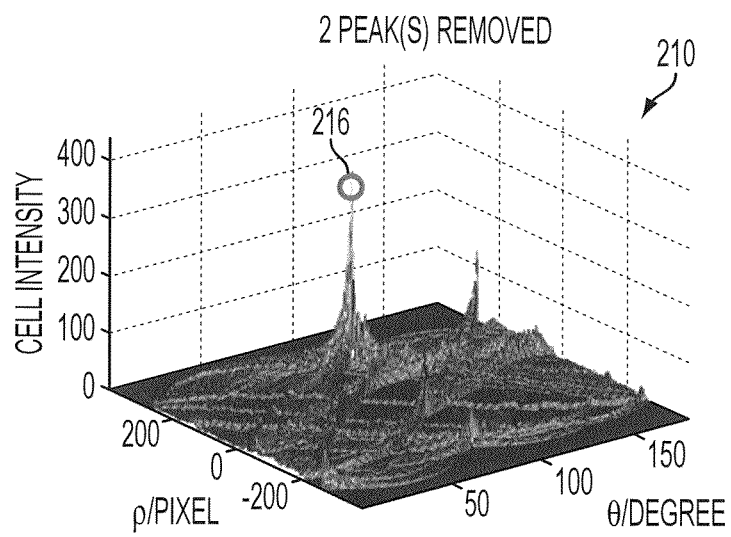
Figure 3G:
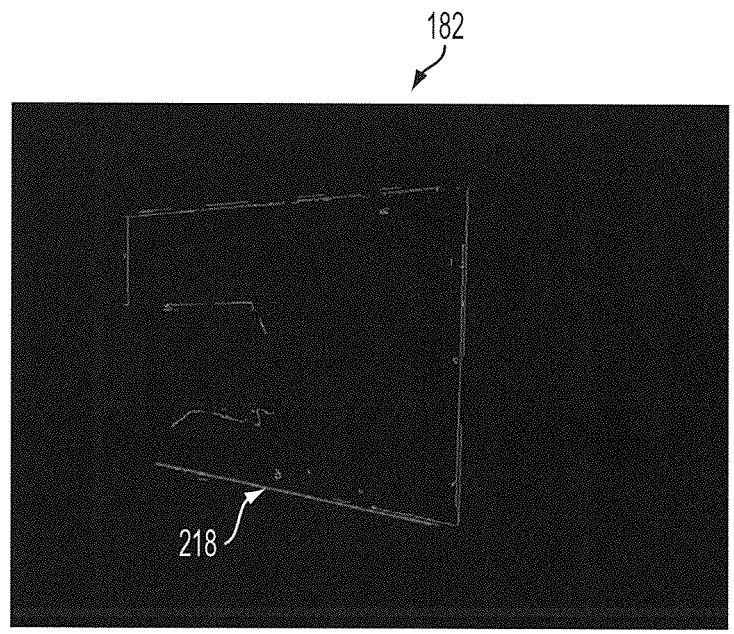

Starting with FIG. 3B, the cell with the largest intensity in the Hough Transform result 190 is identified, and the corresponding peak 200 is circled in the figure. The corresponding straight line 202 is drawn in the edge map 182 in FIG. 3C. The aforementioned removal strategy is applied, resulting in a new Hough transform result 210, shown in FIG. 3D. Similarly, the cell with the largest intensity in the Hough Transform result 210 shown in FIG. 3D is identified as a peak 212, and the corresponding straight line 214 is drawn in the edge map 182 in FIG. 3E. Iteratively, the removal strategy is again applied, leading to another new Hough Transform result 215 in FIG. 3F. Another peak 216 in FIG. 3F is identified, with its corresponding straight line 218 drawn in the edge map 182 in FIG. 3G. The straight line identification algorithm is thus iteratively executed until the largest intensity remaining in the Hough transform result is less than a predefined threshold (i.e., until all peaks in the Hough Transform 190 that are above the predefined threshold have been identified and their corresponding lines drawn in the edge map). In one example, the predefined threshold is selected as the 92th percentile of all non-zero cells in the initial Hough transform result 190, although it will be appreciated that other thresholds may be employed (e.g., 80%, 85%, 87%, 95%, or any other suitable threshold).

Figure 3H:
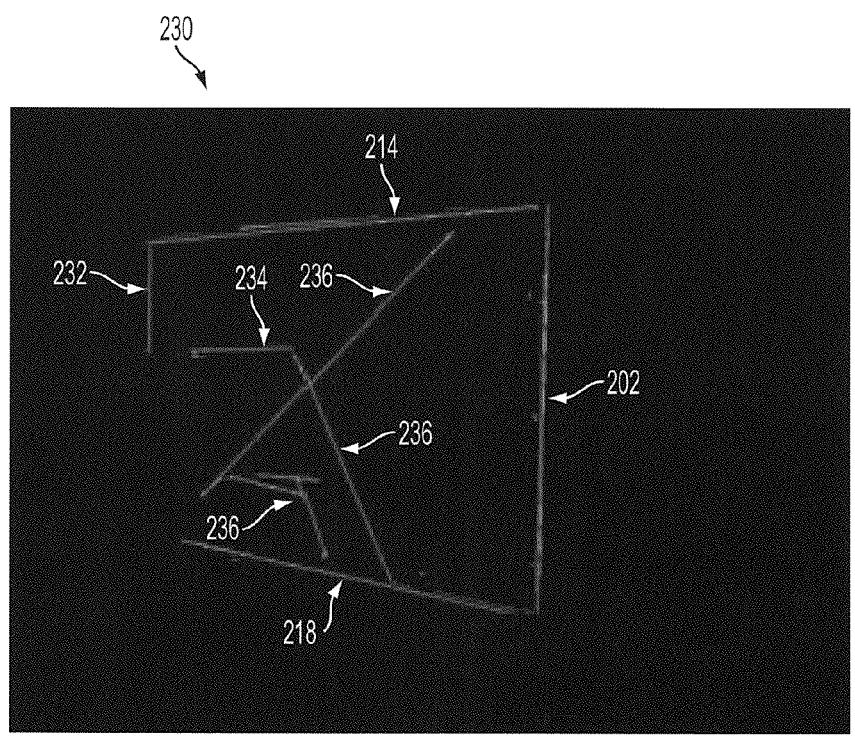

FIG. 3H shows an intermediate edge map 230 having straight lines corresponding to all peaks identified in the iterative straight line identification process. Sets of convergent lines {214, 218, 234} and {202, 232} that are parallel in 3D space have been detected and are shown in the intermediate edge map 230. Additionally, spurious lines 236 may be detected, as illustrated, and these can be removed in a subsequent step.

Figure 4A:
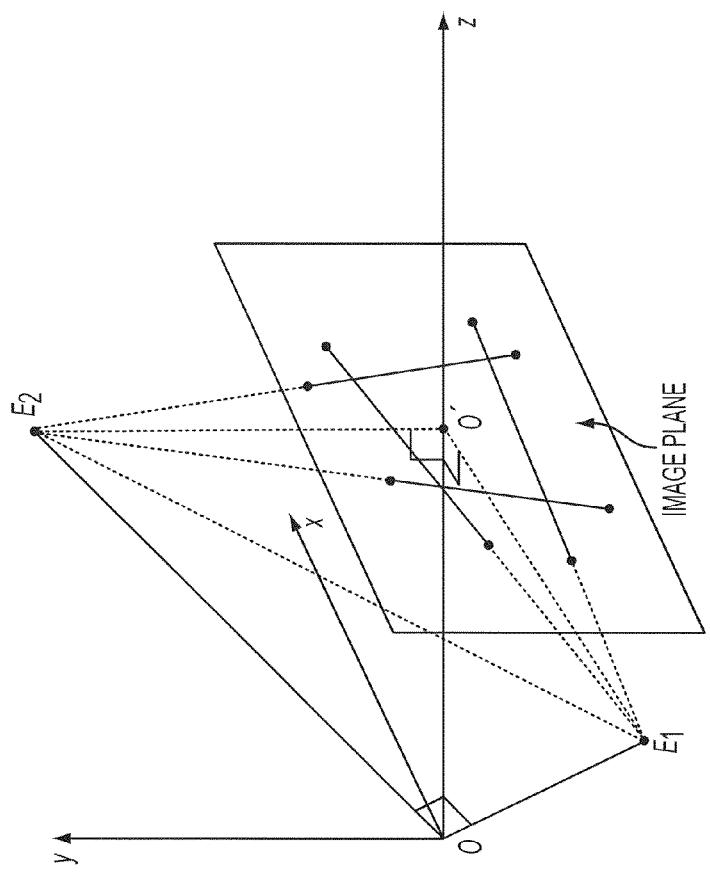
FIG. 4A depicts the 3D scene and camera geometry.
Figure 4C:
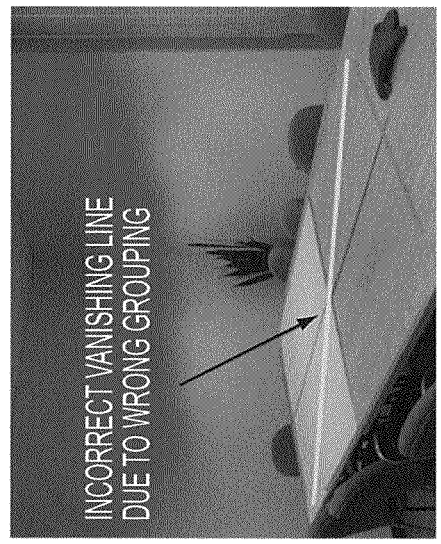
FIG. 4C depicts a scenario whereby the detected lines are grouped incorrectly and lie on both sides of the vanishing line.
Figure 4B:
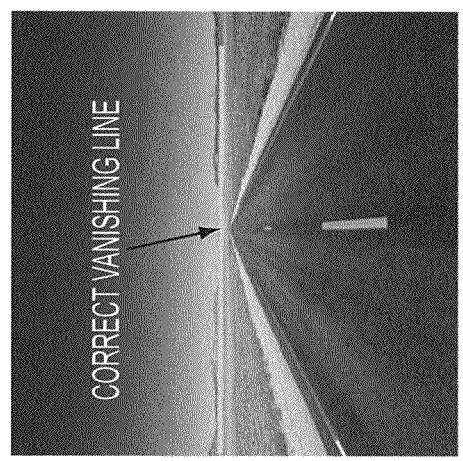
FIG. 4B depicts a scenario whereby the detected lines are grouped correctly and lie on one side of the vanishing line.

FIGS. 4A-4C illustrate steps related to intelligent straight line grouping (e.g., a computer-executable algorithm or the like for grouping detected straight lines into parallel sets), as described above with regard to step 112 of FIG. 1. In this section, an initial estimate is made of two pairs of parallel lines that delineate the grown region, into which personalized and/or variable text is to be inserted, based on the lines detected in the Hough Transform result shown in FIG. 3H. In order to estimate all 3D geometry and related parameters, it is also desirable that the two pairs of parallel lines be mutually perpendicular.

A pre-processing step is applied to remove spurious lines before the grouping step. As can be seen in FIG. 3H, there are short line segments (e.g., sometimes, two short line segments are collinear and are joined in the Hough Transform process). On the other hand, there may be two near-parallel lines that lie very close to each other. The pre-processing step identifies and eliminates these situations, by removing some of the lines. After pre-processing the lines in FIG. 3H, the final lines 202, 214, 218, 232, 234 to be grouped remain in the finalized edge map 240, as shown in FIG. 4A.

As previously stated, an objective of the described systems and methods is to generate two pairs of convergent lines that are parallel in the 3D scene and mutually perpendicular to each other. A line grouping and estimation algorithm first seeks to select all four lines (i.e., a first set of parallel lines and a second set of parallel lines perpendicular to the first set) from the detected lines. If a valid selection exists, then that valid selection is used as the initial estimate of two pairs of parallel lines. Otherwise, the algorithm proceeds to select three lines from the detected lines and estimates the position of the remaining line. Again if valid selection exists, the algorithm presents the current valid selection as the initial estimate. If the algorithm cannot identify at least two parallel lines and a line perpendicular thereto (three lines) from the detected lines, it then moves on to select two lines from the detected lines and estimates the other two lines. If no parallel or perpendicular lines are present in the edge map, the algorithm selects one line and generates the other three lines in a default position, or places all four lines in a default position. The default position may be user-selected or may be a function of the boundaries of the grown region.

Overall, the line grouping and estimation algorithm can be deemed as a "greedy" algorithm as it sequentially seeks to select 4, 3, 2 and then 1 line from the detected lines sequentially, rather than optimizing a cost measure for all situations, although convergent optimization of multiple cost measures is contemplated in accordance with one or more other features of the described systems and methods, as will be understood.

There are four principles or criteria that are considered when identifying the sets of parallel lines to determine 3D geometry for the grown region, as follows: first, the two pairs of parallel lines should result in a valid 3D scene and camera geometry; second, the 3D parameters have prior distributions that can be leveraged; third, detected and estimated lines usually lie on one side of the vanishing line; and fourth, convergence of detected lines suggests that they are likely to be parallel in 3D.

With regard to the first principle that two pairs of parallel lines should result in a valid 3D scene and camera geometry, as described in U.S. patent application Ser. No. 11/340,103, and with reference to FIG. 4A, the field of view of the camera is computed from the focal length, which is estimated by:

$$OO'=\sqrt{1/2(E_1E_2^2-O'E_1^2-O'E_2^2)}.$$

Here, $E_1$ and $E_2$ are the two vanishing points derived from the two pairs of parallel lines, which are automatically detected or determined according to the herein-described systems and methods, as opposed to being manually determined. O is the projection center as well as the origin of the 3D coordinate system. O' is the center of the image which is also on the optical axis. Hence, OO' is the focal length. In order for the focal length to be computed, the expression under the square root needs to be greater than 0, which is defined by the equation:

$$E_1E_2^2>O'E_1^2+O'E_2^2.$$

This suggests that $\angle E_1O'E^2$ is an obtuse angle. Therefore, the first criterion is that, when connecting the two vanishing points to the projection center (i.e., the center of the image), the resulting angle should to be obtuse.

Regarding the second principle that 3D parameters have prior distributions that can be leveraged, as described in U.S. patent application Ser. No. 11/340,103, two relevant 3D parameters are the field of view of the camera, and the normal vector of the plane. In one example, the field of view in the range of 15-75 degrees, although larger or smaller fields of view are contemplated. Extremely large (e.g., wide-angle) and small (e.g., telephoto) fields of view are also accommodated by the described systems and methods. A similar observation can be made with the normal vector of the plane. For instance, normal vectors pointing upwards, representing horizontal planes (i.e. ground or floor, ceiling, etc.), and many normal vectors pointing in a near-horizontal direction, representing vertical planes (screens, walls etc) can be accommodated. With further analysis, prior distributions of the two 3D parameters can also be obtained, which facilitates selecting a more probable 3D setup from all valid 3D setups. For example, consider two pairs of parallel lines that will result in a field of view of 10 degrees, and another two pairs of parallel lines that will induce a 45 degrees field of view. Even though both are valid selections according to Principle 1, the latter is chosen because 45 degrees is a more common angle for the field of view than is 10 degrees.

In one example, the prior distributions of the 3D parameters need not be used explicitly. However, when estimating the missing line(s), implicit use is made of the fact that the planes are more often horizontal or vertical, and the field of view tends to be between approximately 15 to 75 degrees.

With regard to the third principle, that all detected and estimated lines usually lie on one side of the vanishing line, this statement is true when all detected and estimated lines are co-planar in the 3D scene. A vanishing line, also referred to as a horizon line, is the straight line that connects all vanishing points for a given plane. Referring to FIG. 4B, it is readily observed that both green lines are on one side of (i.e. beneath) the vanishing line, shown as the yellow solid line. This is an example of a correct line grouping. On the other hand, referring to FIG. 4C, it is observed that an incorrect line grouping produces a vanishing line such that the grouped lines lie on either side of the vanishing line.

With regard to the fourth principle, that the convergence of detected lines suggests that they are likely parallel in 3D, it is helpful to recognize a set of multiple lines that are convergent, meaning that they pass through the same point. Convergence suggests that lines are parallel in 3D space, and the point that they pass through is the vanishing point.

Figure 5A:
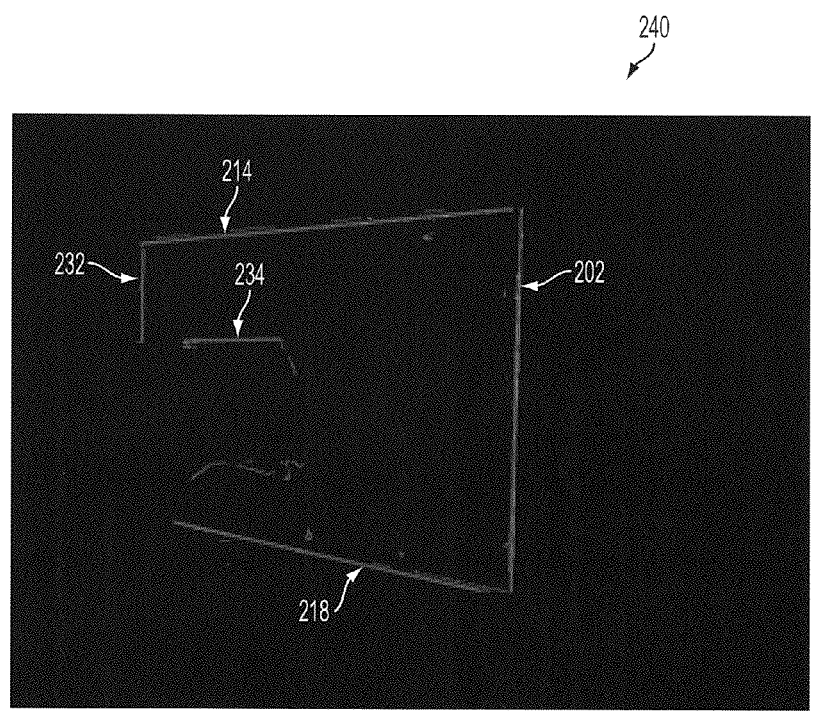
FIGS. 5A-5C illustrate steps related to intelligent straight line grouping.

For instance, in FIG. 5A the upper and lower sides of the bulletin board represented by lines 214, 218 in the edge map 240, as well as the middle horizontal line 234, are convergent, which can be verified by computation. The corresponding vanishing point is far left, outside the image. Therefore, it is presumed that these three lines are parallel in 3D space. Hence, when grouping lines, we can select the first pair of parallel lines from these three lines.

Figure 5C:
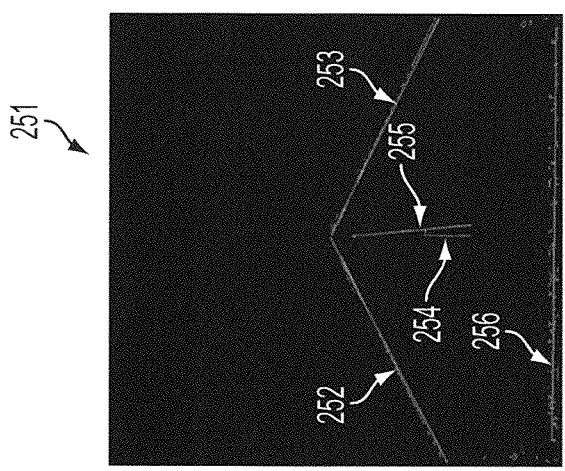
Figure 5B:
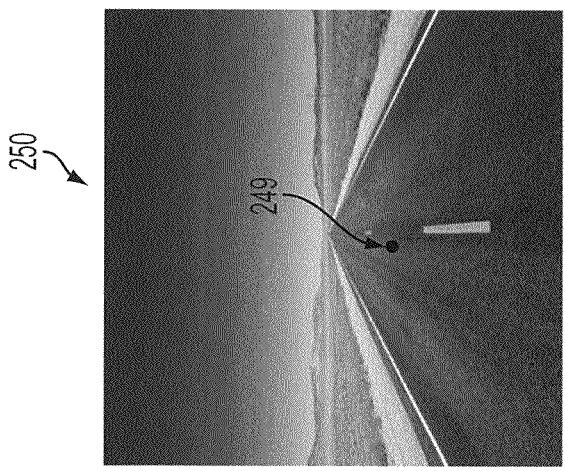

FIGS. 5B and 5C illustrate another example of convergent lines. In FIG. 5B, the user has selected an initial location 249 on a road in an image 250. In the resulting edge map, five lines 252, 253, 254, 255, 256 are detected, with four lines 252, 253, 254, 255 being convergent, shown in FIG. 5C. These four lines are detected from the left, right and middle markers of the road, and are indeed parallel in 3D space. Using the four principles described, the line grouping and estimation strategy is carried out with one of the following four scenarios.

FIGS. 6A-9C and related description provide further detail with regard to selecting and/or estimating pairs of parallel lines for 3D planar surface geometry estimation, as described with regard to step 114 of FIG. 1.

Figure 6A:
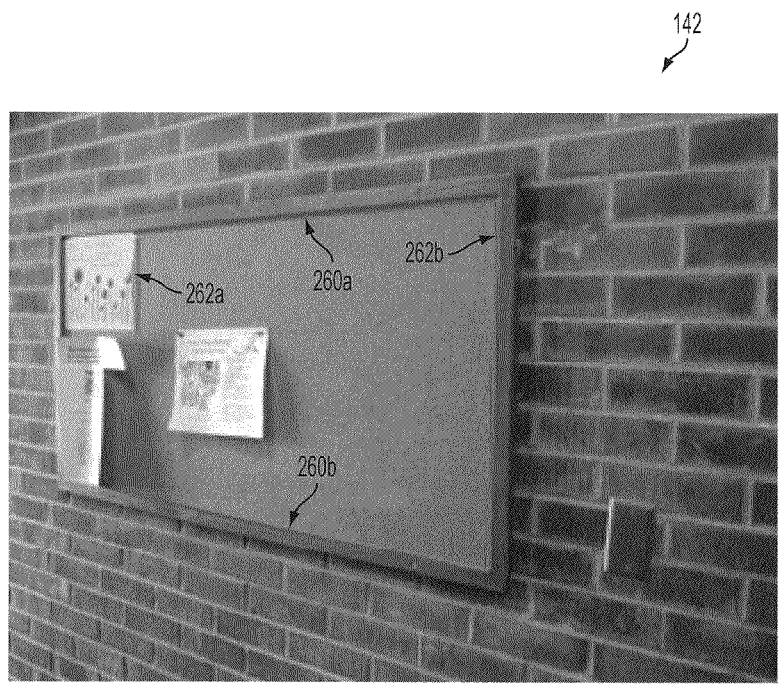
FIGS. 6A-6D illustrate a first scenario for line grouping and 3D geometry estimation in the image, in which four of the detected lines are selected (i.e., two pairs of parallel lines, each pair being perpendicular to the other pair).

FIGS. 6A-6D illustrate a first scenario for line grouping and 3D geometry estimation in the image 142, in which four of the detected lines are selected (i.e., two pairs of parallel lines, each pair being perpendicular to the other pair). Convergence detection is implemented to identify a group of parallel lines. The above-described first and third principles are employed to determine whether the current grouping is valid or not. An exhaustive search is conducted to find all valid selections of two pairs of parallel lines. If multiple valid grouping selections exist, the grouping that has the largest sum of line lengths is selected. For instance, in FIG. 5A, there are five lines detected, with four of them selected to form a valid selection of two pairs of parallel lines, as illustrated in FIG. 6A. That is, parallel lines 260a and 260b are selected, along with parallel lines 262a and 262b, because the lines 260 are orthogonal to the lines 262.

Figure 6D:
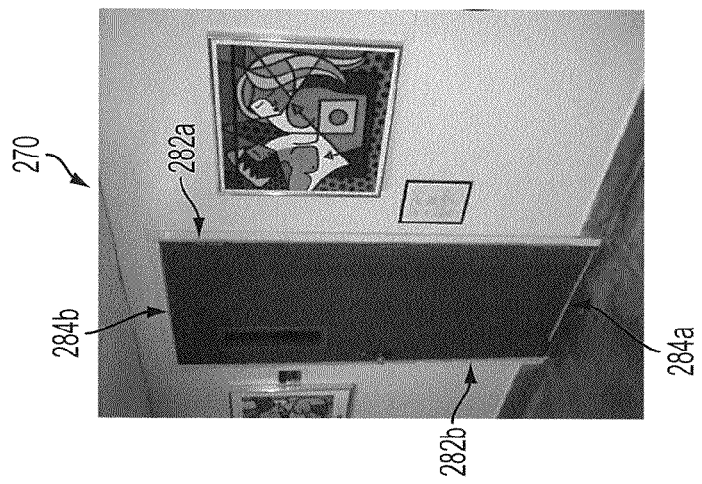
Figure 6C:
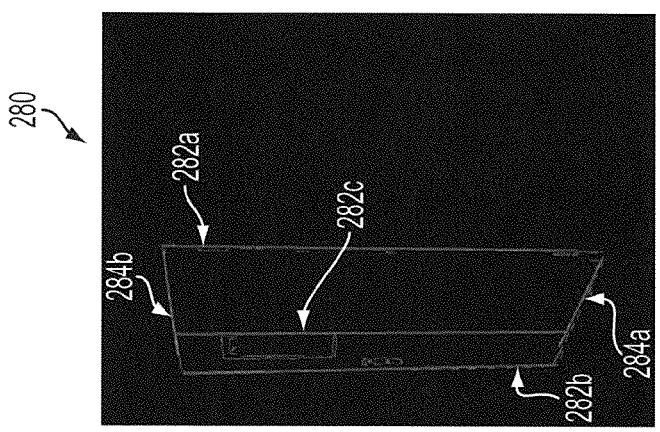
Figure 6B:

FIGS. 6B-6D illustrate another example in which multiple sets of lines are detected in an image. From an input image 270 in FIG. 6B on which a user has selected an initial location 272 (i.e., for region growth and edge detection), the herein-described computer-executable algorithm detects five lines. FIG. 6C shows an edge map 280 including three vertical lines labeled 282a, 282b, 282c, and two horizontal lines 284a, 284b. As shown in FIG. 6D, the algorithm has selected four of the lines 282a, 282c, 284a, 284b (i.e., two pairs of parallel lines) based on the described strategy.

FIGS. 7A-7D illustrate a second scenario for line grouping and 3D geometry estimation, in which three of the detected lines are selected, and the fourth line is estimated. First, three lines are selected from the detected lines, with two of them being the first pair of parallel lines. Convergence detection is again computed to guide the selection. Similarly as in the four-line examples of FIGS. 6A-6D, an exhaustive search is conducted to check for all valid selections. Then, for each selection of three lines, a fourth line is estimated. The first and second principles previously described are utilized to guide the estimation of the remaining line. The third principle is also enforced in the estimation process, so that all existing line segments will lie on the same side of the vanishing line. For all valid sets of two pairs of parallel lines, the combination that has the largest sum of line lengths is chosen.

Figure 7A:
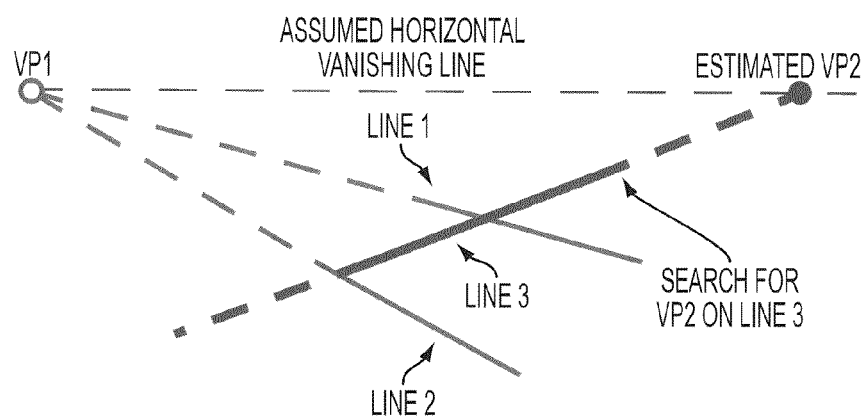
FIGS. 7A-7D illustrate a second scenario for line grouping and 3D geometry estimation, in which three of the detected lines are selected, and the fourth line is estimated.

FIG. 7A illustrates how the remaining line is estimated given the three lines selected from the detected lines. Three lines have been selected from the detected lines, with Lines 1 and 2 being the pair of parallel lines, and Line 3 being the other single line. Thus, the first vanishing point VP1 can be determined by intersecting Line 1 and Line 2. At this point the second vanishing point is determined to estimate 3D parameters. It is known that the second vanishing point will be on Line 3. Therefore, instead of estimating the missing Line 4, the location of the second vanishing point VP2 is directly estimated by searching on Line 3 using an observation in the second principle previously described: namely, that most planes in a given image are either horizontal or vertical. As a result, a horizontal vanishing line or vertical vanishing line is assumed, which facilitates determining an estimated location of the second vanishing point. Principles 1 and 3 are also concurrently imposed.

Figure 7B:
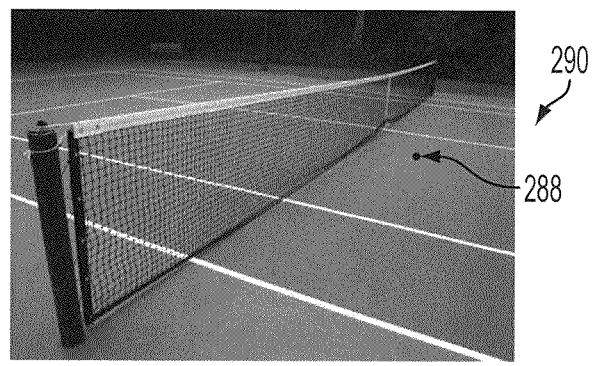
Figure 7C:
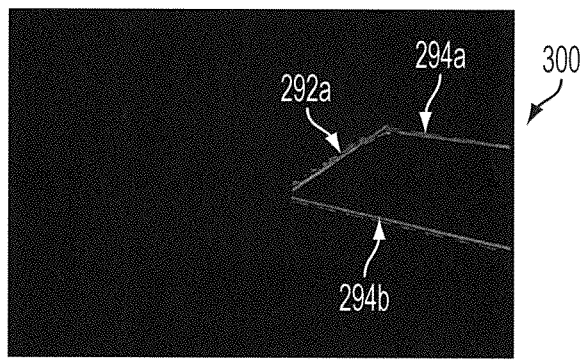
Figure 7D:
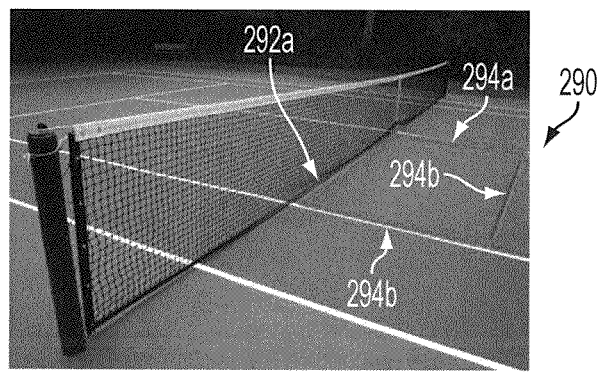

FIGS. 7B-7D show an illustrative image in which three detected lines are selected and a fourth is estimated. In FIG. 7B, a user has selected an initial location 288 that is bounded by three geometric lines in an image 290. The three lines 292a, 294a, and 294b are detected by the Hough Transform and an edge map 300 including the detected lines is generated, as shown in FIG. 7C. There should be another court marker line on the right side, but it is outside the image's field of view. Hence, a remaining line needs to be estimated. Using the procedure described above, the estimated line 292b along with the other three lines 292a, 294a, 294b is shown in FIG. 7D.

FIGS. 8A-8F illustrate a third scenario for line grouping and 3D geometry estimation, in which two of the detected lines are selected, and the third and fourth lines are estimated. For instance, if the procedures described with regard to FIGS. 6A-6C and 7A-7D do not yield a valid selection of two pairs of parallel lines, the algorithm proceeds to select two lines from the detected lines, and subsequently estimates the other two lines using a procedure similar to the one described with regard to FIGS. 7A-7D. First, two lines are selected after an exhaustive search. Then, the other two lines are estimated by imposing the first and third above-described principles, as well as making use of the observations associated with the second principle. In addition to forcing the vanishing line to be horizontal or vertical, the field of view is also computed when estimating the two lines, with the objective of making the field of view as close as possible to the mid-range angle (e.g., 45 degrees).

Figure 8A:
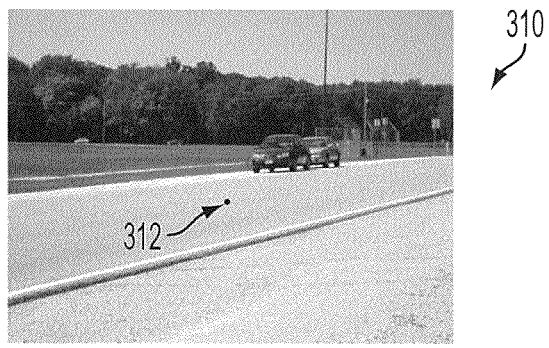
FIGS. 8A-8C illustrate an example for a third scenario in which only two straight lines are detected, which are parallel to each other.
Figure 8B:
Figure 8C:
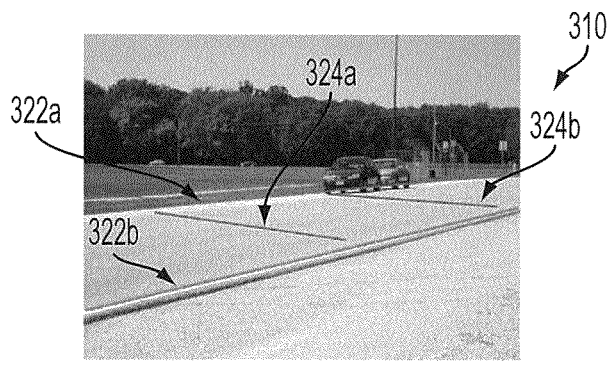
Figure 8D:
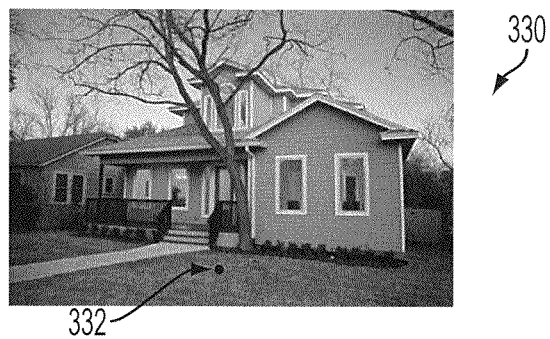
FIGS. 8D-8F illustrate an example for a scenario in which the two lines detected are perpendicular to each other.
Figure 8E:
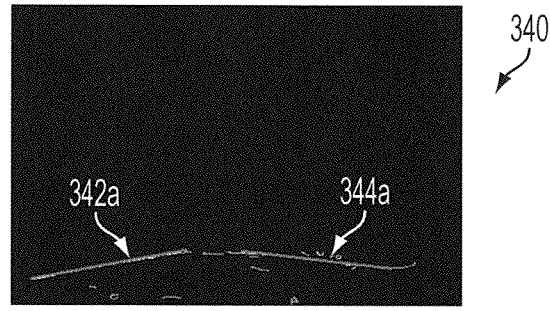
Figure 8F:

Additionally, there are two distinctive situations in which two lines may need to be estimated. The first scenario is that the selected two lines are parallel, and the estimation step tries to estimate another pair of parallel lines, as shown in FIGS. 8A-8C. In this case, one vanishing point is fixed, while the other one needs to be estimated. The second scenario is that the selected two lines are mutually perpendicular rather than parallel, as shown in FIGS. 8D-8F, and the estimation step estimates an additional two perpendicular lines. Thus, both vanishing points are not fixed, but both points lie on two detected lines, respectively. The problem to be solved is to compute two line searches simultaneously. The search algorithm for both situations utilizes the observations made with regard to the second principle, attempting to make a horizontal or vertical plane, while keeping the field of view close to mid-range.

FIGS. 8A-8C illustrate an example for the first situation, in which two lines are detected, which are parallel to each other. FIG. 8A shows an image 310 in which a user has selected an initial location 312 in the middle of a road. In FIG. 8B, two sides of the road are detected and shown in an edge map 320 as lines 322a and 322b, while the other two lines need to be estimated. By forcing a horizontal plane, and making an assumption on field of view, the additional parallel lines 324a, 324b are reasonably estimated, as shown in FIG. 8C.

FIGS. 8D-8F illustrate an example for the second situation, in which the two lines detected are perpendicular. The two vanishing points are searched respectively along these two lines, and a horizontal plane is again forced. FIG. 8D shows an image 330 in which a user has selected an initial location 332 in the middle of a lawn. In FIG. 8E, two edges of the lawn are detected and shown in an edge map 340 as lines 342a and 344a, while the other two lines need to be estimated. By forcing a horizontal plane, and making an assumption on the field of view, the additional parallel lines 342b, 344b are reasonably estimated, as shown in FIG. 8F.

Figure 9A:
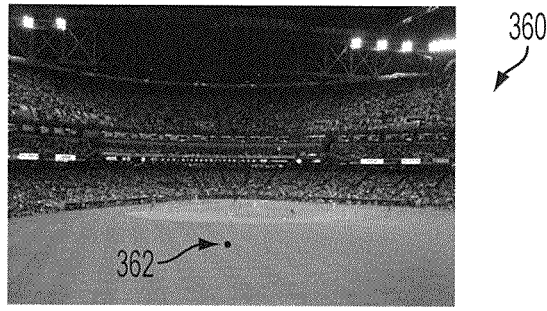
FIGS. 9A-9C illustrate a fourth scenario for line grouping and 3D geometry estimation, in which only one of the detected lines is selected, and second, third and fourth lines are estimated at default positions, or in which all four lines are estimated at default positions.
Figure 9B:
Figure 9C:
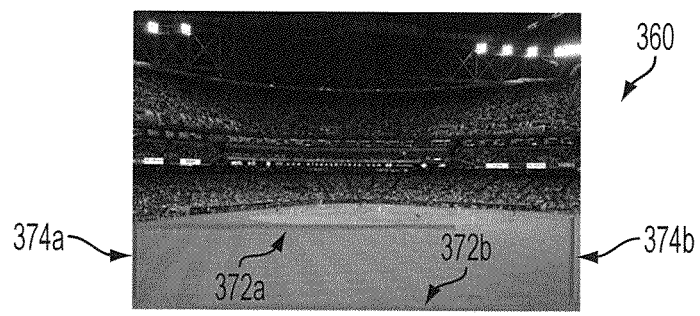

FIGS. 9A-9C illustrate a third scenario for line grouping and 3D geometry estimation, in which only one of the detected lines is selected, and the second, third and fourth lines are estimated at default positions, or in which all four lines are estimated at default positions. In the case where only one line is known, the algorithm can resort to default positions for the lines. FIG. 9A shows an image 360 of a baseball field in which a user has selected an initial location 362. In this case, it may be difficult to detect a salient line in the baseball field, even though the field is a desirably flat plane for inserting text. FIG. 9B shows an edge map 370 in which a single line 372a has been detected. FIG. 9C shows the image 360, in which a second line 372b has been estimated at a bottom edge of the image and parallel to the detected line 372a. Also shown are parallel lines 374a and 374b, which have been estimated at vertical edges of the image and perpendicular to the detected line 372a and its estimated parallel line 372b.

It will be appreciated that this strategy can be implemented within an interactive design tool (e.g., a computer program executed and/or presented to a user on a computer, such as the computer 50 of FIG. 1), and that if desired, the user may manually adjust the lines to as appropriate in scenarios such as described with regard to the preceding Figures.

Figure 10:
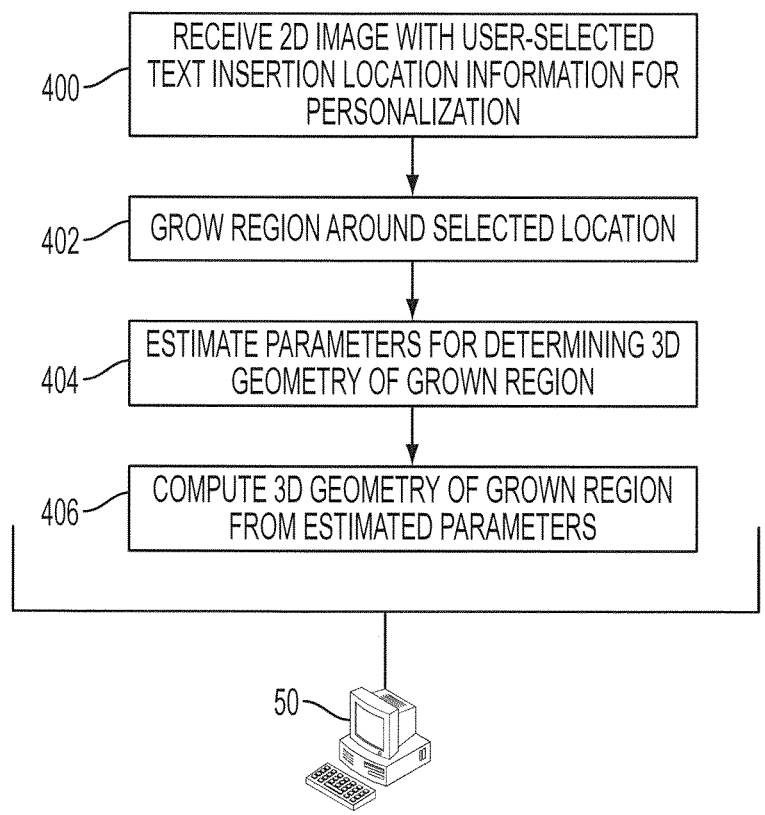
FIG. 10 illustrates a computer-implemented method for determining planar surface geometry for image personalization, and executable as a set of computer-executable instructions.

FIG. 10 illustrates a computer-implemented method for determining planar surface geometry for image personalization, and executable as a set of computer-executable instructions or the like, for instance on a computer 50. At 400, a 2D image having a user-selected location within the image for personalization is received. At 402, a region is automatically grown (e.g., using connected component analysis or some other suitable technique) around the selected location in the 2D image. At 404, parameters (e.g., camera angle, normal vector, etc.) required for deriving the three-dimensional (3D) planar geometry of the grown region are automatically estimated. At 406, the 3D planar geometry of the grown region is computed as a function of the estimated 3D parameters.

Estimating parameters for deriving 3D planar geometry of the grown region can include without limitation performing an edge detection procedure (e.g., Canny's edge detection algorithm or the like) to detect straight lines in the grown region and generate an edge map of the grown region, the straight lines corresponding to straight geometric features in the 3D planar geometry of at least one object in the 2D image. Straight line detection is achieved by computing a Hough transform for the edge map, locating intensity peaks in the Hough transform that are above a predetermined threshold intensity, iteratively identifying a highest peak in the Hough transform, and adding a straight line corresponding to the identified peak to the edge map. Each identified peak is then removed from the Hough transform once the straight line is added to the edge map. Remaining peaks having intensities above the predetermined intensity threshold are iteratively identified and corresponding straight lines are added to the edge map until all peaks having intensities above the predetermined intensity threshold have been removed from the Hough transform. Once all straight lines in the grown region have been identified, the parallel line grouping and selection are performed as described with regard to FIGS. 6-9.

Accordingly, the computer-executable algorithms described with regard to FIGS. 1-10 facilitate effective and automatic estimation of the parameters used to calculate 3D planar surface geometry for inserting personalized text in images. Specifically, the parameters are two pairs of lines that within pairs are parallel in the 3D scene and between pairs are mutually perpendicular.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for determining planar surface geometry for image personalization comprising:
   receiving a two-dimensional (2D) image having a selected location within the image for personalization;
   automatically growing a region around the selected location in the 2D image;
   automatically estimating parameters required for deriving three-dimensional (3D) planar geometry of the grown region; and
   determining the 3D planar geometry of the grown region as a function of the estimated 3D parameters;
   wherein estimating parameters for deriving 3D planar geometry of the grown region further comprises:
      performing an edge detection procedure to detect straight lines in the grown region and generate an edge map of the grown region, the straight lines corresponding to geometric features in the 3D planar geometry of at least one object in the 2D image;
      preprocessing the image to remove spurious straight lines in the edge map; and
   grouping remaining straight lines into a first set and a second set of 3D parallel lines, wherein the first set of 3D parallel lines is perpendicular to the second set of 3D parallel lines in 3D space.

2. The method according to claim 1, further comprising:
   rendering a personalized text string onto the image at the selected location according to the determined 3D planar geometry.

3. The method according to claim 1, wherein the edge detection is performed using a Canny Edge Detector.

4. The method according to claim 1, wherein detecting the straight lines further comprises:
   computing a Hough transform for the edge map;
   locating intensity peaks in the Hough transform, the peaks having an intensity that is above a predetermined threshold intensity;
   iteratively identifying a highest peak in the Hough transform;
   adding a straight line corresponding to the identified peak to the edge map, and removing the identified peak from the Hough transform once the straight line is added to the edge map; and
   continuing to iteratively identify remaining peaks having intensities above the predetermined intensity threshold, add corresponding straight lines to the edge map and removing the identified peaks, until all peaks having intensities above the predetermined intensity threshold have been removed from the Hough transform.

5. The method according to claim 1, wherein estimating parameters further comprises:
   identifying a first pair of 3D parallel lines from the first set, and a second pair of 3D parallel lines from the second set; and
   deriving a first vanishing point for the first pair of 3D parallel lines and a second vanishing point for the second pair of 3D parallel lines.

6. The method according to claim 5, further comprising permitting a user to adjust a position of the lines in the identified first and second pairs of 3D parallel lines.

7. The method of claim 5 wherein the grouping and identifying steps are performed using one or more of the following criteria about plausible planar surface geometry:
   the first and second pair of 3D parallel lines result in a valid 3D scene and camera geometry, wherein validity of the 3D scene is evaluated as a function of an angle formed by a center of the image and the first and second vanishing points;
   the 3D geometry parameters are drawn from known prior probability distributions;
   all identified lines lie on one side of the vanishing line;
   convergence of identified lines suggests that they are parallel in 3D.

8. The method of claim 7 wherein all four lines corresponding to both pairs are detected directly from the edge map.

9. The method of claim 8 further comprising:
   performing an exhaustive search across all possible parallel line pairs to solve for a first and a second pair of 3D parallel lines that satisfy said criteria; and
   if multiple solutions arise, selecting the first and second pair that has the largest sum of line lengths.

10. The method according to claim 7, wherein at least one of the lines from the first and second pair of 3D parallel lines is not detected directly from the edge map and is instead estimated based on one or more of the criteria.

11. The method of claim 1, wherein determining the 3D planar geometry comprises computing the field of view and normal vector from two vanishing points corresponding to the two pairs of 3D parallel lines.

12. A computer-implemented method for defining a bounding polygon in an image for text insertion, comprising:
   receiving an image for personalization;
   receiving input regarding a user-selected location in the image for text insertion;
   growing a region around the selected location;
   generating an edge map of the grown region;
   detecting straight lines in the edge map;
   preprocessing the image to remove spurious straight lines in the edge map;
   grouping remaining straight lines into a first set and a second set of 3D parallel lines, wherein the first set of 3D parallel lines is perpendicular to the second set of 3D parallel lines in 3D space;
   estimating a 3D geometry of the grown region based on the first and second sets of 3D parallel lines; and
   rendering a personalized text string in the grown region according to the estimated 3D geometry.

13. The method of claim 12, wherein the region is grown using a connected-component analysis, and the edge map is generated using a Canny's edge detection technique.

14. The method of claim 12, wherein detecting straight lines in the edge map further comprises:
   computing a Hough transform for the edge map;
   locating intensity peaks in the Hough transform, the peaks having an intensity that is above a predetermined threshold intensity;
   iteratively identifying a highest peak in the Hough transform;
   adding a straight line corresponding to the identified peak to the edge map, and removing the identified peak from the Hough transform once the straight line is added to the edge map; and
   continuing to iteratively identify remaining peaks having intensities above the predetermined intensity threshold, add corresponding straight lines to the edge map, and removing the identified peak from the Hough transform, until all peaks having intensities above the predetermined intensity threshold have been removed from the Hough transform.

15. The method of claim 12, wherein the estimating 3D geometry further comprises:
   identifying a first pair of 3D parallel lines in the edge map by determining whether at least two detected straight lines converge on a first vanishing point; and
   identifying a second pair of 3D parallel lines in the edge map by determining whether at least two detected straight lines converge on a second vanishing point
   wherein the first pair of 3D parallel lines is perpendicular to the second pair of 3D parallel lines in 3D space.

16. The method of claim 15, further comprising:
   permitting a user to adjust a position of the lines in the selected pairs of parallel lines.

17. The method according to claim 12, wherein estimating the 3D geometry comprises:
   identifying a first pair of 3D parallel lines from the first set, and a second pair of 3D parallel lines from the second set; and
   deriving a first vanishing point for the first pair of 3D parallel lines and a second vanishing point for the second pair of 3D parallel lines.

18. The method of claim 17, wherein the grouping and identifying steps further comprise determining that the 3D parallel lines meet one or more criteria related to planar surface geometry the one or more criteria comprising at least one of:
   the first and second pair of 3D parallel lines result in a valid 3D scene and camera geometry, wherein validity of the 3D scene is evaluated as a function of an angle formed by a center of the image and the first and second vanishing points;
   the 3D geometry parameters are drawn from known prior probability distributions;
   all identified lines lie on one side of the vanishing line; and
   convergence of identified lines suggests that they are parallel in 3D space.

19. The method of claim 17, wherein all four lines corresponding to both pairs are detected directly from the edge map, and further comprising:
   performing an exhaustive search across all possible parallel line pairs to solve for a first and a second pair of 3D parallel lines that satisfy said criteria; and
   if multiple solutions arise, selecting the first and second pair that has the largest sum of line lengths.

20. The method according to claim 17, wherein at least one of the lines from the first and second pairs of 3D parallel lines is not detected directly from the edge map and is instead estimated based on one or more of the criteria.

21. The method of claim 12, wherein determining the 3D planar geometry comprises computing a field of view and normal vector from two vanishing points corresponding to the two pairs of 3D parallel lines.

* * * * *